US007703595B2

(12) United States Patent
Berger et al.

(10) Patent No.: US 7,703,595 B2
(45) Date of Patent: Apr. 27, 2010

(54) METHOD AND DEVICE FOR TRANSPORTING MULTIPLE ITEMS

(75) Inventors: Gisbert Berger, Berlin (DE); Jürgen Hohlwegler, Allensbach (DE); Jörg-Andreas Illmaier, Kreuzlingen (CH); Wolf-Stephan Wilke, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 18 days.

(21) Appl. No.: 12/212,671

(22) Filed: Sep. 18, 2008

(65) Prior Publication Data

US 2009/0071802 A1 Mar. 19, 2009

(30) Foreign Application Priority Data

Sep. 18, 2007 (DE) ........................ 10 2007 044 712
Dec. 5, 2007 (DE) ........................ 10 2007 058 579
Apr. 4, 2008 (DE) ........................ 10 2008 017 187

(51) Int. Cl.
*B65G 37/00* (2006.01)

(52) U.S. Cl. ........................ 198/349; 198/358; 209/584; 700/226; 705/406

(58) Field of Classification Search ................. 198/358, 198/349, 349.5, 349.6; 209/584, 900; 235/375, 235/454; 705/406, 410; 700/225, 226
See application file for complete search history.

(56) References Cited

U.S. PATENT DOCUMENTS 6,082,521 A * 7/2000 Maier et al. .............. 198/349.6
6,208,910 B1 * 3/2001 Michael et al. ............. 700/225
6,279,750 B1 * 8/2001 Lohmann .................... 209/559
6,510,992 B2 * 1/2003 Wells et al. ................. 235/385
6,888,084 B1 * 5/2005 Bayer ......................... 209/584
7,235,756 B2 * 6/2007 De Leo et al. .............. 209/584
7,415,131 B2 * 8/2008 Mampe et al. .............. 209/546
7,574,015 B2 * 8/2009 Desprez et al. .............. 382/101
2004/0049315 A1 3/2004 Sansone et al.
2005/0269395 A1 12/2005 Miette et al.
2006/0253406 A1 11/2006 Caillon
2007/0215529 A1 9/2007 Desprez et al.
2008/0149540 A1 6/2008 Olivier et al.

FOREIGN PATENT DOCUMENTS

| | | | |
|---|---|---|---|
| DE | 40 00 603 | C2 | 9/1998 |
| DE | 199 47 259 | C1 | 9/2000 |
| EP | 1 222 037 | B1 | 7/2002 |
| FR | 2881663 | A1 | 8/2006 |
| WO | 2006/100357 | A1 | 9/2006 |

* cited by examiner

*Primary Examiner*—James R Bidwell
(74) *Attorney, Agent, or Firm*—Laurence A. Greenberg; Werner H. Stemer; Ralph E. Locher

(57) ABSTRACT

A method and device are provided for transporting items, in particular postal consignments. A transport process is performed from an intermediate store to a continuation point. Each item that was conveyed to the intermediate store before generation of a start signal is removed from the intermediate store. The items transported are transferred from the intermediate store into a transport device. A record is stored of which items were conveyed to the intermediate store between generation of the start signal and generation of an end signal. The items transported in the transport device are removed from the transport device. For each item that was transported, a data record that has been stored for the item is determined. The stored data record is determined exclusively from the data records generated for those items that were conveyed to the intermediate store between generation of the start signal and generation of the end signal.

9 Claims, 3 Drawing Sheets

METHOD AND DEVICE FOR TRANSPORTING MULTIPLE ITEMS

CROSS-REFERENCE TO RELATED APPLICATION

This application claims the priority, under 35 U.S.C. § 119, of German applications DE 10 2007 044 712.6, filed Sep. 18, 2007; DE 10 2007 058 579.0, filed Dec. 5, 2007; DE 10 2008 017 187.5, filed Apr. 4, 2008; the prior applications are herewith incorporated by reference in their entirety.

BACKGROUND OF THE INVENTION

Field of the Invention

The invention relates to a method and a device for transporting multiple items, in particular postal consignments.

A postal consignment typically passes through a sorting installation at least twice and is then transported to the respectively predefined destination address. The destination address of the postal consignment is read during the first pass. The read destination address is determined again during the second pass.

Traditionally, a coding of the destination address is printed onto the postal consignment during the first pass. This coding is read during the second pass. In order to avoid printing on postal consignments, it is proposed in German patent DE 40 00 603 C2 that a feature vector of the postal consignment be measured during the first pass and this feature vector stored together with the read destination address. During the second pass, the postal consignment is measured afresh, a further feature vector being generated by this measure. The further feature vector is compared with the stored feature vectors in order to find the stored feature vector of the same item. The destination address that is stored together with the found feature vector is used as the destination address to which the postal consignment is to be transported.

This search requires that many feature vectors be compared with one another, which is time-consuming. As the number of transported postal consignments grows, the risk that the wrong feature vector will be found among the stored feature vectors increases. Restrictions on the search space have therefore already been proposed.

A method and a device for transporting multiple items, in particular postal consignments is known from EP 1222037 B1, corresponding to U.S. Pat. No. 6,888,084. The items there are likewise postal consignments that pass through sorting machines. Such a sorting machine discharges postal consignments into sorting terminals that function as intermediate stores. In order to reuse read results, a method is used which is known as fingerprinting and which is presented e.g. in DE 4000603 C2.

For each postal consignment, a data record is generated and filed in a central database. The data record contains the read delivery address. In order to restrict the search space when searching for the data record, a record is stored of which postal consignment is transported in which container. This approach requires that it be known precisely which postal consignment is transported in which container. In reality, this can sometimes not be established with sufficient certainty.

SUMMARY OF THE INVENTION

It is accordingly an object of the invention to provide a method and a device for transporting multiple items which overcome the above-mentioned disadvantages of the prior art methods and devices of this general type, in which a search space restriction is executed and it is nonetheless not necessary to determine exactly which items are actually located in a transport device and are transported together by a transportation process to an intermediate store.

With the foregoing and other objects in view there is provided, in accordance with the invention, a method for transporting multiple items having at least one predefined measurable transport attribute and at least one predefined measurable feature. The method includes performing for each of the items, the steps of: measuring, for each predefined measurable transport attribute, what value the predefined measurable transport attribute assumes for each item resulting in a measured transport attribute value; and measuring, for each predefined measurable feature, a value which the predefined measurable feature assumes for the item resulting in a measured feature value. For each of the items, a data record is stored containing the measured transport attribute value of the item and the measured feature value of the item. Multiple transport processes are executed. In each transport process respectively at least one of the items is conveyed into an intermediate store and is transported by a transport device from the intermediate store to a continuation point respectively. Each of the items is transported by one of the transport processes to the continuation point. A fresh measurement is performed of what value the predefined measurable feature assumes for the item resulting in a feature value. The feature value measured in the fresh measurement step is used for determining the data record that was stored for the item resulting in a determined data record. A further transportation of the item is triggered in dependence on the measured transport attribute value contained in the determined data record. In at least one of the transport processes from the intermediate store to the continuation point, a sequence is performed which includes generating a start signal; removing each of the items which were conveyed to the intermediate store before generation of the start signal from the intermediate store; transferring the items transported in the transport process from the intermediate store into the transport means used for the transport process; generating an end signal once a transfer of the items to the transport means is complete; storing a record of which of the items were conveyed to the intermediate store between generation of the start signal and generation of the end signal; executing the transport process; removing the items transported in the transport means from the transport means; and executing, for each of the items transported in the transport process, a search-space restriction when determining the data record stored for the item, which consists in the stored data record being determined exclusively from among such data records as were generated for the items which were conveyed to the intermediate store between generation of the start signal and generation of the end signal.

In the method according to the invention, multiple items are transported. Each of these items is provided with at least one predefined measurable transport attribute. Furthermore, at least one measurable feature is predefined.

For each predefined transport attribute, a measurement is made of the value that this attribute assumes for this item. For each predefined feature, the value that the feature assumes for this item is measured. A value that a predefined feature assumes for this item is measured. It is possible for the values of multiple features to be measured and a feature vector generated as a result.

For each item, a data record is generated and stored. The data record contains respectively, a coding of each transport attribute value and the respectively measured feature value of the item.

Multiple transport processes are executed. In each transport process, at least one of the items is conveyed respectively to an intermediate store and transported by a transport device from the intermediate store to a continuation point respectively. Here, each of the items is transported by one of the transport processes to a continuation point. It is possible for multiple items to be transported together in one transport device to the same continuation point and for different items to be transported to various continuation points.

After an item has been transported to its respective continuation point, a fresh measurement is taken of the value which the at least one feature assumes for this item. The data record that has been stored for this item is determined. The feature value measured during the fresh measurement is used for this search.

A search-space restriction is executed for at least one transport process. In this transport process, too, at least one item is transported from an intermediate store to a continuation point. A sequence containing the following steps is executed for this transport process:

A start signal is generated.

Each item that was conveyed to the intermediate store before generation of the start signal is removed from the intermediate store.

The items transported in this transport process are transferred from the intermediate store to the transport device used for this transport process.

An end signal is generated after transfer of the items to the transport device is complete.

A record is stored of which items were conveyed to the intermediate store between generation of the start signal and generation of the end signal.

The transport process is executed. The items transported in the transport device are removed from the transport device.

For each item that has been transported in this transport process, a search-space restriction is executed when determining the data record stored for this item.

The search-space restriction consists in the stored data record being sought only among defined data records, i.e. exclusively among such data records as were generated for those items which were conveyed to the intermediate store between generation of the start signal and generation of the end signal.

The item data record determined for an item contains the measured value of the transport attribute. Further transportation of the item is triggered. This further transportation depends on the transport attribute value that has been measured for the item and is stored in the determined data record.

The method according to the invention ensures that all items which are transported in the at least one transport process by the transport device from the intermediate store to the continuation point, were conveyed to this intermediate store between generation of the start signal and generation of the end signal. It is possible for further items to have been conveyed to the intermediate store between these two points in time, but not to be transported in this transport process.

The invention saves on the need to establish an exact assignment between the data records for the items that are being conveyed together in a transport device and the transport device. Deviations from a target process during loading may lead to the assignment not matching reality and to an incorrect data record being assigned to an item during further transportation. An exact assignment can therefore sometimes not be guaranteed.

Instead, the method according to the invention supplies information about a superset of those items that are actually transported in the transport device. Each item actually transported is included in this superset, and further items can be included in the superset.

The transport attribute is, for example, an identification of a destination address to which the item is to be transported and with which the item is furnished. Further transportation to the destination address that is contained in the determined data record is triggered in this case. The transport attribute can also be a dimension or the weight of the item. The transport attribute can also be the result of an analysis of a shipping fee with which the item is furnished.

The method can be used e.g. for transporting postal consignments or passengers' items of luggage. For example, sorting installations or vehicles with which items of luggage are conveyed can function as intermediate stores. The method can also be applied to the transportation of items of production between various production facilities of a production plant e.g. to cars.

In one embodiment, each item is furnished with details of the respectively predefined destination point to which this item is to be transported. In particular, the item is a postal consignment or a freight consignment. In another embodiment, the item is a luggage item of a passenger and is furnished with details relating to the owner. This luggage item is to be transported to a destination address that depends on the identity of the passenger.

Other features which are considered as characteristic for the invention are set forth in the appended claims.

Although the invention is illustrated and described herein as embodied a method and a device for transporting multiple items, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
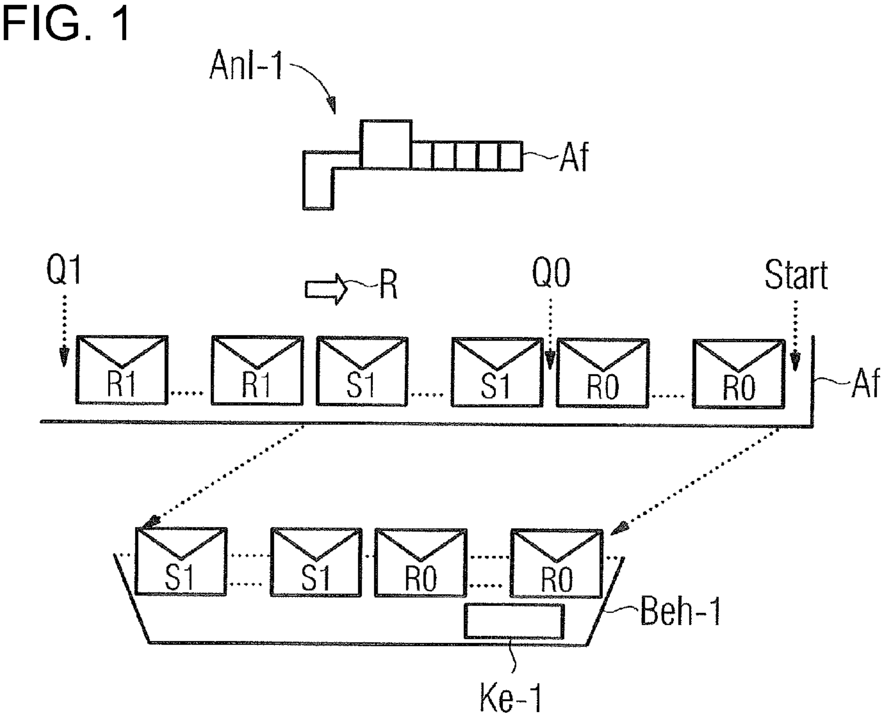
FIG. 1 is a diagrammatic, illustration showing the situation at a first sorting installation at a moment when a second signal Q1 is generated.

In the exemplary embodiment, the items to be transported are postal consignments. Each postal consignment is furnished with an identification of the particular delivery address to which this postal consignment is to be transported. The delivery address functions as the destination point of the postal consignment. The identification has usually been affixed to the postal consignment before the commencement of transportation. It is, however, also possible that it will be affixed only during transportation.

Each postal consignment passes through a sorting installation at least twice. It is possible for a postal consignment to pass through the same sorting installation several times or through one sorting installation three times. The sorting installation used during the first pass is designated the first sorting installation and the sorting installation used during the second pass the second sorting installation.

During the first pass, at least the delivery address is determined. It is possible for further features to be measured, e.g. the weight of the postal consignment or the franking with which the postal consignment is provided.

Preferably, a reading device of the first sorting installation initially attempts to determine the delivery address automatically by optical character recognition (OCR). If this is unsuccessful, then a person reads the delivery address and inputs at least a part of the read delivery address, e.g. the zip code. The first sorting address discharges the postal consignment into one of multiple output compartments, depending on the delivery address recognized. Here, the postal consignments pass through the first sorting installation in a stream of consecutive items. This sorting installation discharges individual postal consignments from the stream, routing them to one of the output compartments.

From time to time, postal consignments are removed from each output compartment and transferred to a container. It is possible here for an output compartment to be completely emptied. It is also possible here for one or more postal consignments to remain in the output compartment, e.g. because not all the postal consignments in the output compartment will fit into the container. If, however, postal consignments remain in an output compartment, then these will be the postal consignments discharged last.

The container into which postal consignments are transferred from the output compartment is furnished with a label. This label specifies in the exemplary embodiment the location to which the container with the postal consignments is to be transported. This location is referred to below as an "intermediate point", as it is an intermediate point on the pathway of the postal consignments in the container to the respective delivery address.

The intermediate point is a feeding device to a second sorting installation, for example a feeder of the second sorting installation. The container with the postal consignments is transported to this intermediate point and emptied there. The postal consignments from the container are fed to the second sorting installation. This further sorting installation determines the delivery address of each postal consignment, which the first sorting installation has read. Then, the second sorting installation in turn discharges the postal consignment, depending on the delivery address, into one of the output compartments. Transportation of the postal consignment to this delivery address is initiated.

A delivery area is assigned to each possible delivery address. During each pass, all postal consignments to the same delivery area are discharged into the same output compartment. It is possible for a postal consignment to pass through the same sorting installation several times, for example because the number of output compartments is lower than the number of predefined delivery areas. In this case, n-pass sequencing is preferably executed. Such a method is known from European patent EP 948416 B1, corresponding to U.S. Pat. No. 6,703,574. After the first pass, the postal consignments that the sorting installation has discharged into an output compartment are transferred into a container. The container is transported to the feeding device of the second sorting installation, and the postal consignments are fed into the sorting installation for the second pass.

In the example from FIG. 1, the postal consignments are fed from an output compartment Af-1.1 to a feeding device ZE-1 and pass though the installation Anl-1 afresh. A reason for this may be that n-pass sequencing is executed, as just described. It is also possible for individual postal consignments to pass through the sorting installation Anl-1 several times because off-line video coding is executed. During the first pass, a digital image of the postal consignment is generated. If the address in this image cannot be recognized automatically, the image is transmitted to a video coding station. There, the address is input manually. After this has happened, the postal consignment passes through the sorting installation afresh and is discharged into an output compartment, depending on the address input. A postal consignment can therefore also pass through the first sorting installation Anl-1 because it is dispatched within a location or delivery area, and the first sorting installation Anl-1 executes both the entry sorting and the exit sorting.

It is also possible for a container containing postal consignments which have passed through a sorting installation for the first time to be transported to a different location and there to be fed into the second sorting installation. It is also possible for some postal consignments to be transported in a container from an output compartment of the second sorting installation to a feeding device of a third sorting installation and for these postal items to be fed into the third sorting installation.

It would be highly inexpedient if the second and each further sorting installation had to read afresh the delivery address that the first sorting installation has already read. The traditional procedure for avoiding this is for the first sorting installation to print a coding of the delivery address on to the postal consignment, e.g. in the form of a bar code. The second and each further sorting installation reads this bar code.

However, it is frequently not desirable for a postal consignment to be furnished with a bar code. An agreement of the Universal Postal Union (UPU) provides that cross-border postal consignments shall not be furnished with a bar code, since different postal service providers normally use different coding systems.

Therefore, in the exemplary embodiment a method is used which has come to be known by the name of "fingerprinting" or "virtual ID" and is described e.g. in German patent DE 4000603 C2 and European patent EP 1222037 B1 and which enables each further sorting installation to determine without a bar code the delivery address which the first sorting installation has read.

In the exemplary embodiment, various features of a postal consignment are predefined which can be measured externally while the postal consignment passes through a sorting installation. Examples of such features are: dimensions of the postal consignment, the distribution of gray levels and/or color tones on a surface of the postal consignment, the position and dimension of the franking mark, the position and size of the address block and/or of the details relating to the sender, and features of the delivery address, e.g. the zip code.

In the exemplary embodiment, each sorting installation is connected to the same central database. As soon as a postal consignment passes through the first sorting installation, a data record is generated for this postal consignment and stored in the central database. This data record contains: a unique identifier of the postal consignment, the destination address which the first sorting installation has read, and optionally, further features of the postal consignment, e.g. its weight or its franking.

The identifier distinguishes the postal consignment from all other postal consignments which pass through one of the sorting installations within a defined period of time. The time period is e.g. ten days long. The identifier can be printed onto the postal consignment or else used exclusively internally in the database.

The first sorting installation measures for each postal consignment that passes through the first sorting installation and for each predefined feature the respective value which this feature assumes for this postal consignment. In this way, the first sorting installation generates a feature vector (or more precisely: feature value vector) for the postal consignment. Where there are N features, this feature vector consists of N feature values. The data record for the postal consignment also contains, besides the delivery address, the feature vector.

The second and each further sorting installation that the postal consignment passes through measures afresh for each feature the respective value that the feature assumes for this postal consignment. In this way, the second sorting installation likewise generates a feature vector consisting of N feature values for the postal consignment. The second feature vector is compared with the feature vectors of data records that are stored in the central database. The particular data record that was generated during the passage of the postal consignment through the first sorting installation and originates from the same postal consignment is found by this measure. The second sorting installation uses the delivery address of this data record as the delivery address to which this postal consignment is to be transported.

Because a large number of postal consignments pass through each sorting installation on a single day, it would be inexpedient if the feature vector that the second sorting installation has generated were to be compared here with all the feature vectors from the first sorting installation. This would require too much computing time. Particularly where there are many postal consignments, the risk that an incorrect feature vector will be found increases. The search space is therefore restricted.

The exemplary embodiment will be further explained with reference to an output compartment of the first sorting installation, second containers and a feeding device of a second sorting installation. All postal consignments that the first sorting installation discharges into this output compartment are to be transported to the same intermediate point (the same feeding device of the same second sorting installation).

FIG. 1 shows schematically a first sorting installation Anl-1 with an output compartment Af. Postal consignments that the first sorting installation Anl-1 has discharged into the output compartment Af are transferred into a first container Beh-1.

The output compartment is empty at the start of processing. The first sorting installation Anl-1 starts, after generation of a start signal "start", to discharge postal consignments into the output compartment Af. After the discharging, the postal consignments are located in the output compartment Af in a sequence generated by the first sorting installation Anl-1. The sorting installation Anl-1 preferably supplements each data record for a postal consignment with an identifier of the particular output compartment into which it has discharged the postal consignment. This sequence is designated R in the figures.

The first sorting installation Anl-1 preferably also stores for each output compartment the respective sequence in which it discharges the postal consignments into the output compartment. For example, the sorting installation supplements the data record for a postal consignment with an identifier of the output compartment and a coding of the time of the discharge. Instead of a time coding, the sorting installation Anl-1 can also store a coding of a time period, e.g. of a day, and a serial number. The serial number is allocated only once for the time period and specifies the sequential position in the period in which this postal consignment was discharged into this output compartment.

An installation operator places the first container Beh-1 onto a first supporting device in proximity to the output compartment Af. This process triggers the generation of a first signal Q0. It is possible that the output compartment will still be empty when the first signal Q0 is generated. It is also possible that postal consignments will already be located in the output compartment at the generation time. In the example from FIG. 1 the postal consignments which are designated R0 are located in the output compartment Af when the first signal Q0 is generated.

The first container is furnished with a machine-readable identifier Ke-1. The identifier Ke-1 is for example printed in the form of a bar code or matrix code onto the first container or is stored in an RFID chip which is rigidly connected to the first container Beh-1. The first sorting installation Anl-1 reads the container identifier Ke-1 and stores this.

The first sorting installation Anl-1 inscribes a label with an identification of the intermediate point ZE to which this container is to be transported. The label is connected at least temporarily to the first container Beh-1. The identification can be read by an installation operator and is used for transportation of the container Beh-1.

In one variant, the label additionally has a label identifier that is machine-readable. The label identifier is used as a container identifier Ke-1. This design saves on the necessity of having to bring a reading device in proximity to the container Beh-1. Instead, the label identifier is read, which is even possible if the label is not connected to the container Beh-1.

In a development of this variant, the label is generated only if required. For example, an operator provides a signal that triggers its generation. Or the container is placed on or removed from a supporting device, the supporting device being furnished with a sensor. The sensor measures the placement or removal of the container Beh-1, and this measurement triggers generation of the label.

This variant saves on the necessity of having to bring a reading device in proximity to the container Beh-1 or to the label. Rather, the label identifier is allocated upon generation and assigned to the container Beh-1 and the postal consignments deposited therein.

The first sorting installation Anl-1 discharges further postal consignments into the output compartment Af. Postal consignments are then removed from the output compartment Af and transferred into the first container. The removal process may be triggered by the fill level in the output compartment Af having reached or exceeded a predefined limit. It is also possible for the removal process to be triggered in a time-controlled manner. It is not necessary for the first sorting installation to determine which postal consignments have been transferred into the first container. This determination is frequently not possible in practice, at least not unless every postal consignment is furnished with a unique machine-readable identification.

The first container Beh-1 is transported to the intermediate point that is specified by the label. After postal consignments have been removed from the output compartment Af and transferred into the first container Beh-1, the first sorting installation discharges further postal consignments into the output compartment.

The first container Beh-1 is transported to a feeding device ZE of the second sorting installation Anl-2 and there is placed on a second supporting device. The machine-readable identifier Ke-1 of the first container Beh-1 is read. The postal consignments are removed from the first container Beh-1 and fed to the feeding device ZW. The postal consignments then pass through the second sorting installation Anl-2.

For each postal consignment from the first container Beh-1, the particular data record is sought which the first sorting installation Anl-1 has generated for this postal consignment. The second sorting installation Anl-2 measures the postal consignment afresh and generates a feature vector. This current feature vector is compared with the feature vectors of data records which are stored in the central database.

According to the invention, a search-space restriction is performed here. The current feature vector is compared exclusively with those feature vectors that originate from postal consignments that are discharged between generation of the start signal Start and generation of a second signal Q1. For this purpose, the second sorting installation Anl-2 uses the read identifier Ke-1 of the first container Beh-1 and the information 11 that all postal consignments in the first container Beh-1 were discharged into the output compartment Af between the start signal Start and the generation of the second signal Q1.

The second signal Q1 is generated after postal consignments have been transferred into the first container Beh-1. It is possible for the output compartment Af still to be empty when the second signal Q1 is generated. It is also possible that there will already be postal consignments in the output compartment Af again at the generation time. Preferably, the first sorting installation Anl-1 interrupts the discharging of postal consignments into the output compartment Af after the second signal Q1 has been generated. In the example from FIG. 1, the second signal Q1 is generated after the first sorting installation Anl-1 has discharged the postal consignments designated R1 into the output compartment Af.

An installation operator places a second container Beh-2 onto a supporting device in proximity to the output compartment Af. In one embodiment, this process triggers the generation of a second signal Q1. In another embodiment, the second signal Q1 is triggered by the first container Beh-1 being accepted by the supporting device. In a third embodiment, generation of the second signal Q1 is triggered by the generation of a label for the second container Beh-2 being triggered.

The first sorting installation Anl-1 stores which postal consignments were discharged into the output compartment Af between generation of the first signal Q0 and generation of the second signal Q1, and stores this information. For example, the sorting installation stores the following information:

an identifier for the first signal Q0, a coding for the time at which the first signal Q0 was generated, an identifier for the second signal Q1, and a coding for the time at which the second signal Q1 was generated.

In a corresponding manner, the first sorting installation Anl-1 has stored in advance the information as to which postal consignments it has discharged into the output compartment Af between generation of the start signal Start and generation of the first signal Q0.

Or the first sorting installation Anl-1 stores which postal consignment was the last to be discharged before generation of the first signal Q0 and which was the first to be discharged after generation of the second signal Q1. In this embodiment, the discharging sequence is additionally stored, as described above. Which postal consignments the first sorting installation Anl-1 has discharged between generation of the first signal Q0 and that of the second signal Q1 can therefore be reconstructed.

FIG. 1 illustrates the situation at the first sorting installation Anl-1 at the moment when the second signal Q1 is generated. The first sorting installation Anl-1 first discharges the postal consignments designated R0 into the output compartment Af, then those designated S1 and then those designated R1. The sequence in which the first sorting installation Anl-1 discharges the postal consignments is designated R in FIG. 1. Which postal consignments the first sorting installation Anl-1 has discharged after generation of the start signal Start and before generation of Q0 and which it has discharged between generation of Q0 and generation of Q0 is indicated.

At the time at which the signal Q0 is generated, only the postal consignments designated R0 are located in the output compartment Af. These postal consignments were discharged after generation of the start signal Start. Up to the time at which the second signal Q1 is generated, the first sorting installation Anl-1 additionally discharges the postal consignments designated S1 and those designated R1 into the output compartment Af.

The first sorting installation Anl-1 stores the information that between generation of the first signal Q0 and generation of the second signal Q1, all those postal consignments that are designated S1 or R1 in FIG. 1 were discharged into the output compartment Af. It also stores the information that before generation of the first signal Q0 all postal consignments that are designated R0 in FIG. 1 were discharged.

A first transport process is executed with the aid of the first container Beh-1. This first transport process functions as the transport process within the meaning of the patent claims. The container Beh-1 has the machine-readable identifier Ke-1. The first sorting installation Anl-1 reads the identifier Ke-1 and stores the information that all the postal consignments in the container Beh-1 were discharged into the output compartment Af between generation of the start signal Start and generation of the second signal Q1. The first sorting installation Anl-1 preferably stores a link between the container identifier Ke-1 and the two signals Start signal and Q1.

All postal consignments that were discharged into the output compartment before generation of the first signal Q0 (these are designated R0 in FIG. 1) as well as those postal consignments that are designated S1 in FIG. 1 are transferred into the first container Beh-1. The postal consignments designated R1 remain in the output compartment Af. FIG. 1 indicates which postal consignments are transferred into the first container Beh-1 and which postal consignments initially remain in the output compartment Af. At the moment when the signal Q1 is generated, only the postal consignments designated R1 are in the output compartment Af. It does not have to be established which postal consignments are actually transferred into the first container Beh-1 because this information is not needed.

Figure 2:
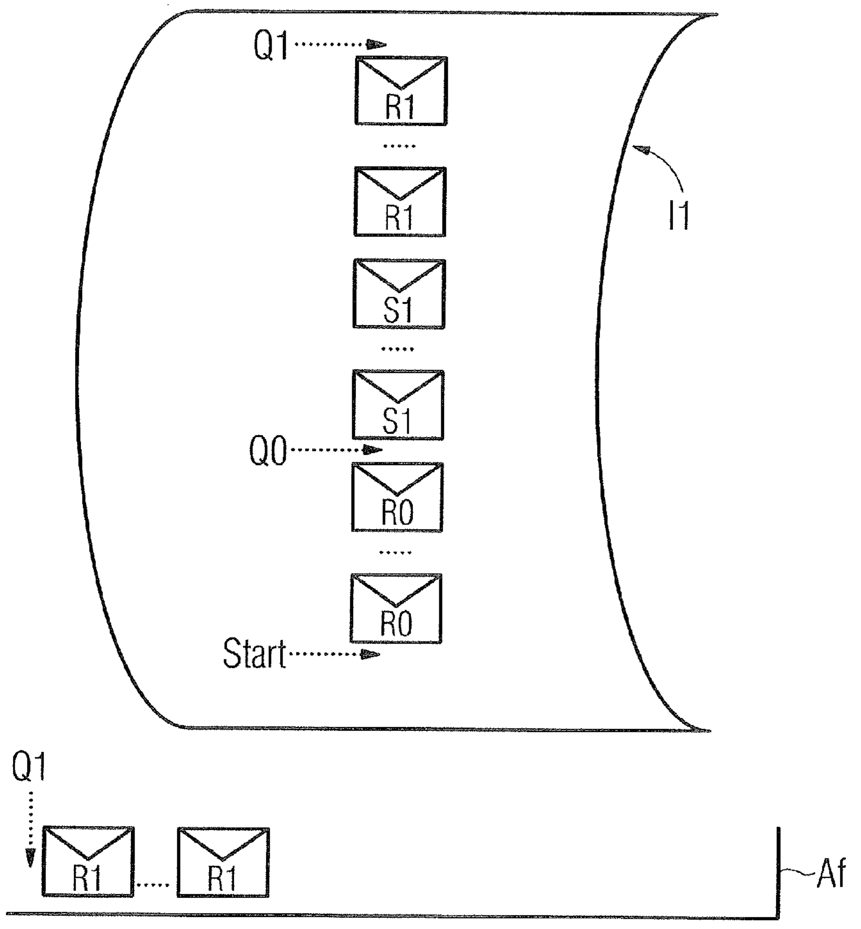
FIG. 2 is a diagrammatic, illustration showing the situation at the first sorting installation after postal consignments have been transferred from an output compartment into a first container.

FIG. 2 illustrates the situation at the first sorting installation Anl-1 after, as just described, postal consignments have been transferred from the output compartment Af into the first container Beh-1 and the second signal Q1 has been generated. Remaining in the output compartment Af are those postal consignments that are designated R1 in FIG. 2. The information 11 that between generation of the start signal Start and that of the first signal Q0 the m postal consignments designated R0 were discharged and between generation of Q0 and that of Q1 the postal consignments that are designated S1 or R1 in FIG. 1 and FIG. 2 were discharged, is stored in the database.

Figure 3:
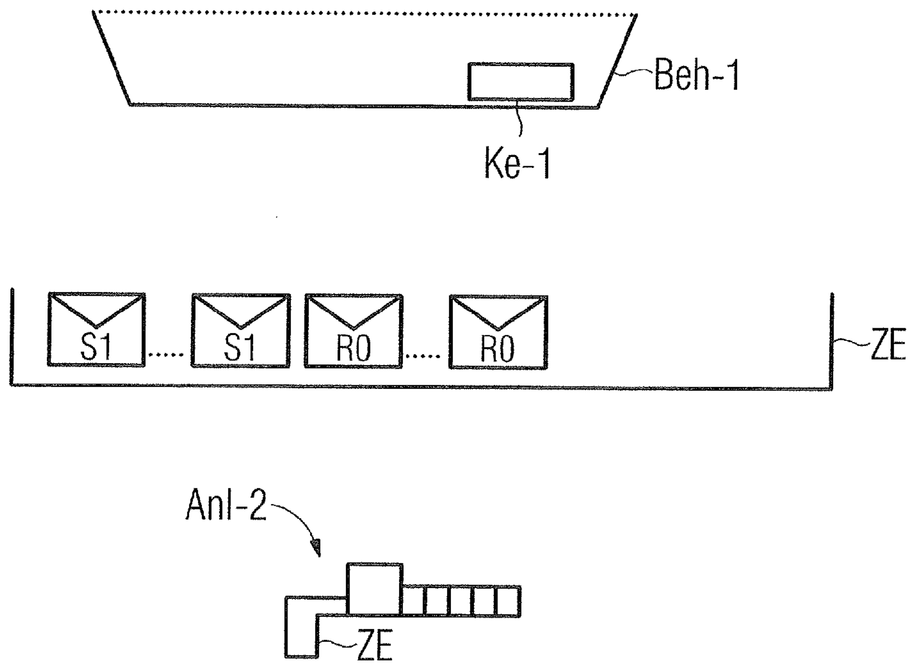
FIG. 3 is a diagrammatic, illustration showing the situation at the first sorting installation after the first container from FIG. 1 has been transported to a feeding device of a second sorting installation and unloaded there.

FIG. 3 illustrates the situation at the second sorting installation Anl-2 after the first container Beh-1 from FIG. 1 has been transported from the first supporting device to the feeding device ZE of the second sorting installation Anl-2 and unloaded there. Those postal consignments that are designated S1 or R0 in FIG. 3 are located in the feeding device ZE.

A second transport process is executed. The second transport process functions as the further transport process within the meaning of the patent claims. The second container Beh-2 is used in the second transport process. The second container has a machine-readable identifier Ke-2.

Further postal consignments from the output compartment Af are transferred into the second container Beh-2. In the process, all those postal consignments that had already been discharged into the output compartment before generation of Q1, as well as preferably further postal consignments that were discharged thereafter, are transferred into the second container Beh-2. The second container is transported away after filling.

A third signal Q2 is generated. The generation of Q2 is triggered, for example, by the second container Beh-2 being taken from the supporting surface Af. The first sorting installation stores which postal consignments it has discharged into the output compartment Af between generation of Q1 and that of Q2. It does this in one of the ways that were described above for the first signal Q0 and the second signal Q1.

Figure 4:
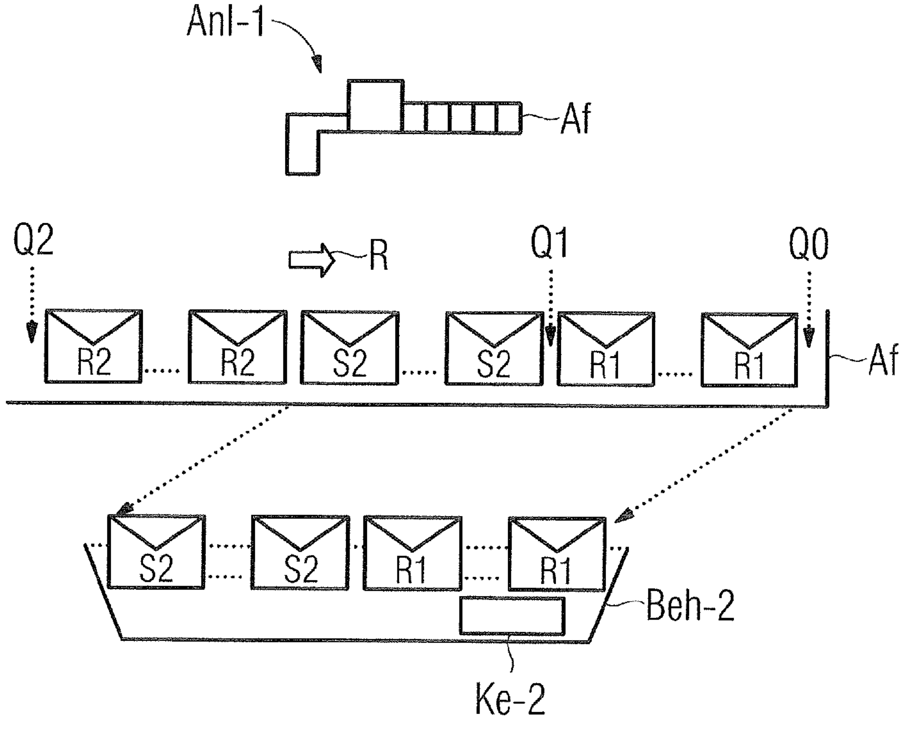
FIG. 4 is a diagrammatic, illustration showing the situation at the first sorting installation at the moment when a third signal Q2 is generated.

FIG. 4 illustrates the situation at the first sorting installation at the moment when the third signal Q2 is generated. In the second transport process, those postal consignments that are designated R1 or S2 are transported in the second container Beh-2.

Figure 5:
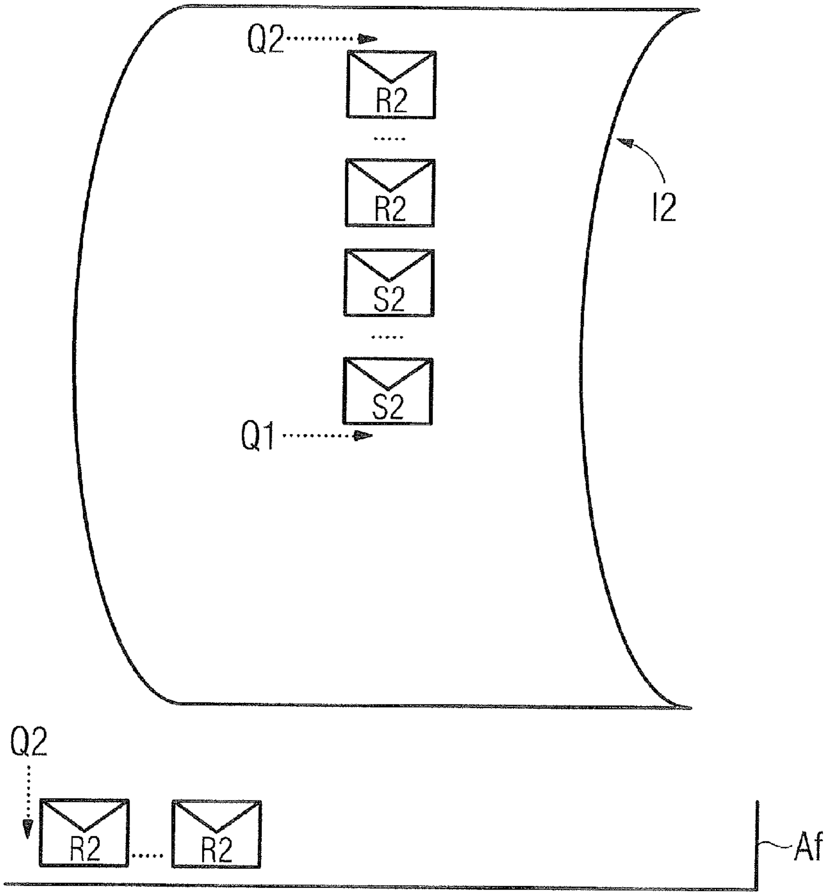
FIG. 5 is a diagrammatic, illustration showing the situation at the first sorting installation after postal consignments have been transferred from the output compartment into the second container.

FIG. 5 shows the situation at the first sorting installation after postal consignments have been transferred from the output compartment Af into the second container Beh-2.

Postal consignments from the output compartment Af have been transferred into the second container Beh-2, and the third signal Q2 generated. Remaining in the output compartment Af are those postal consignments that are designated R2 in FIG. 5. The information 12 that the postal consignments R2 and S2 were discharged between generation of Q1 and that of Q2 is stored in the database.

Figure 6:
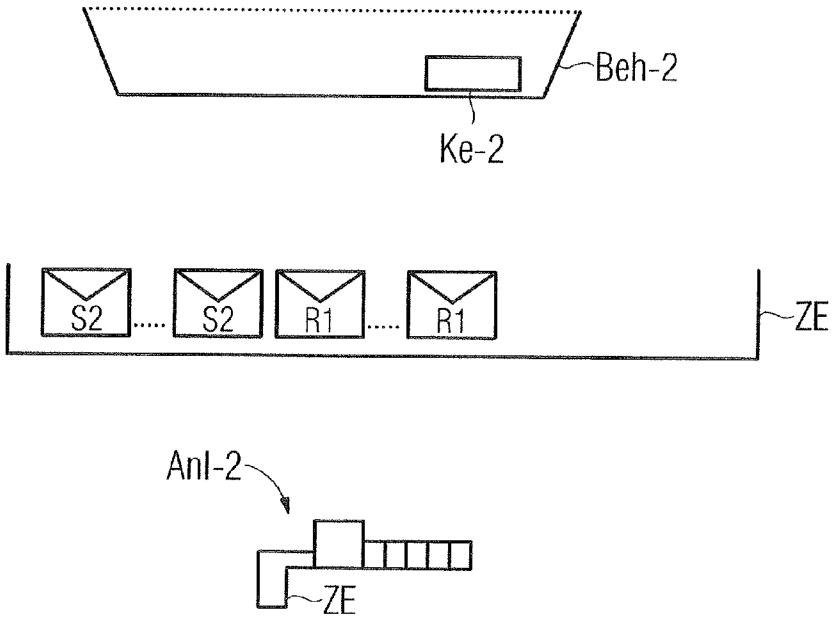
FIG. 6 is a diagrammatic, illustration showing the situation at the second sorting installation after the second container from FIG. 4 has been transported to the feeding device of the second sorting installation and unloaded there.

FIG. 6 illustrates the situation at the second sorting installation after the second container Beh-2 from FIG. 4 has been transported to the feeding device ZE of the second sorting installation Anl-2 and unloaded there. Those postal consignments which are designated S2 or R1 in FIG. 5 are now located in the feeding device ZE. Further transport processes are executed, wherein further signals are generated.

The invention claimed is:

1. A method for transporting multiple items having at least one predefined measurable transport attribute and at least one predefined measurable feature, which comprises the steps of:

performing for each of the items, the steps of:

measuring, for each predefined measurable transport attribute, what value the predefined measurable transport attribute assumes for each item resulting in a measured transport attribute value;

measuring, for each predefined measurable feature, a value which the predefined measurable feature assumes for the item resulting in a measured feature value;

storing for each of the items a data record containing the measured transport attribute value of the item and the measured feature value of the item;

executing multiple transport processes, wherein in each transport process respectively at least one of the items is conveyed into an intermediate store and is transported by means of a transport means from the intermediate store to a continuation point respectively;

transporting each of the items by one of the transport processes to the continuation point;

performing a fresh measurement of what value the predefined measurable feature assumes for the item resulting in a feature value;

using the feature value measured in the fresh measurement step for determining the data record which was stored for the item resulting in a determined data record;

triggering a further transportation of the item in dependence on the measured transport attribute value contained in the determined data record;

performing for at least one of the transport processes from the intermediate store to the continuation point, a sequence including the steps of:

generating a start signal;

removing each of the items which were conveyed to the intermediate store before generation of the start signal from the intermediate store;

transferring the items transported in the transport process from the intermediate store into the transport means used for the transport process;

generating an end signal once a transfer of the items to the transport means is complete;

storing a record of which of the items were conveyed to the intermediate store between generation of the start signal and generation of the end signal;

executing the transport process;

removing the items transported in the transport means from the transport means; and executing, for each of the items transported in the transport process, a search-space restriction when determining the data record stored for the item, which consists in the stored data record being determined exclusively from among such data records as were generated for the items which were conveyed to the intermediate store between generation of the start signal and generation of the end signal.

2. The method according to claim 1, which comprises the steps of:

providing the transport means used in the at least one transport process for which the sequence is executed with an identifier;

determining the identifier upon transfer of the items into the transport means;

storing transport information that all the items transferred into the transport means with the identifier were conveyed to the intermediate store between generation of the start signal and generation of the end signal;

determining the identifier afresh upon removal of the items from the transport means; and executing the search-space restriction using the identifier which was determined upon removal and the stored transport information.

3. The method according to claim 1, which further comprises:

triggering the generation of the start signal when the transport means is brought to a predefined position relative to the intermediate store; and triggering the generation of the end signal when the transport means is removed from the relative position.

4. The method according to claim 1, wherein in executing the sequence, the storing of which of the items were conveyed to the intermediate store between generation of the start signal and generation of the end signal, comprises the step whereby each data record for an item which was conveyed to the intermediate store between generation of the start signal and generation of the end signal, is supplemented with an identifier of the start signal and an identifier of the end signal.

5. The method according to claim 1, which further comprises conveying at least one item to the intermediate store after generation of the start signal and before generation of the end signal and the at least one item is transported by a further transport process to an intermediate point.

6. The method according to claim 5, wherein for the further transport process:

executing a sequence for generating a further start signal and a further end signal; and executing a further search-space restriction using the further start signal and the further end signal for each item which is transported in the further transport process.

7. The method according to claim 1, which further comprises:

furnishing each of the items with details of a predefined destination point to which the item is to be transported; and during the measuring of the predefined measurable transport attribute of the item performing the further step of reading the details with which the item is furnished and further transportation of the item to the respectively read destination point is triggered.

8. The method according to claim 1, wherein the items transported are postal consignments.

9. A transport device for transporting multiple items, each of the items having a predefined measurable transport attribute and at least one predefined measurable feature, the transport device comprising:

an intermediate store;

an attribute-measuring device;

a feature-measuring device;

a transport means;

a data processing device; and a data store;

said attribute-measuring device configured for measuring for each predefined measurable predefined attribute of each said item what value the predefined measurable transport attribute assumes for the item resulting in a measured transport-attribute value;

said feature-measuring device configured for measuring for each predefined measurable feature of each said item what value the predefined measurable feature assumes for the item resulting in a measured feature value;

said data processing device configured for storing for each said item in said data store a data record, said data record containing:

each said measured transport-attribute value of the item; and each said measured feature value of the item;

said transport means configured for executing multiple transport processes, said transport means conveying in each of said transport processes respectively at least one of the items:

into said intermediate store; and transports together by use of said transport means from said intermediate store to one continuation point respectively;

said feature-measuring device being configured for measuring afresh for each said item, after said item latter has been transported to a continuation point, what value the predefined measureable feature assumes for the item;

said data processing device configured for determining, using the feature value measured in the fresh measurement, the data record which was stored for the item resulting in a determined data record;

said transport means configured for triggering further transportation of the item, depending on the measured transport attribute value which is contained in the determined data record;

said transport means configured for executing a sequence for at least one transport process from said intermediate store to the continuation point, whereby said transport device generates a start signal;

each said item which was conveyed to said intermediate store before generation of the start signal is removed from said intermediate store;

the items transported in the transport process are transferred from said intermediate store into said transport means used for the transport process;

said transport device generates an end signal after a transfer of the items to said transport means is complete;

said data processing device stores a record of which of the items were conveyed to said intermediate store between generation of the start signal and generation of the end signal;

the transport process is executed;

the items transported in said transport means are removed from said transport means; and said data processing device performs for each said item which was transported in the transport process a search-space restriction when determining the data record stored for the item, which consists in said data processing device determining the stored data record exclusively from among such data records as were generated for the items which were conveyed to said intermediate store between generation of the start signal and generation of the end signal.

* * * * *